June 7, 1949. J. M. CLARK 2,472,284
CYLINDER BACK PRESSURE VALVE
Filed March 2, 1946 2 Sheets-Sheet 1
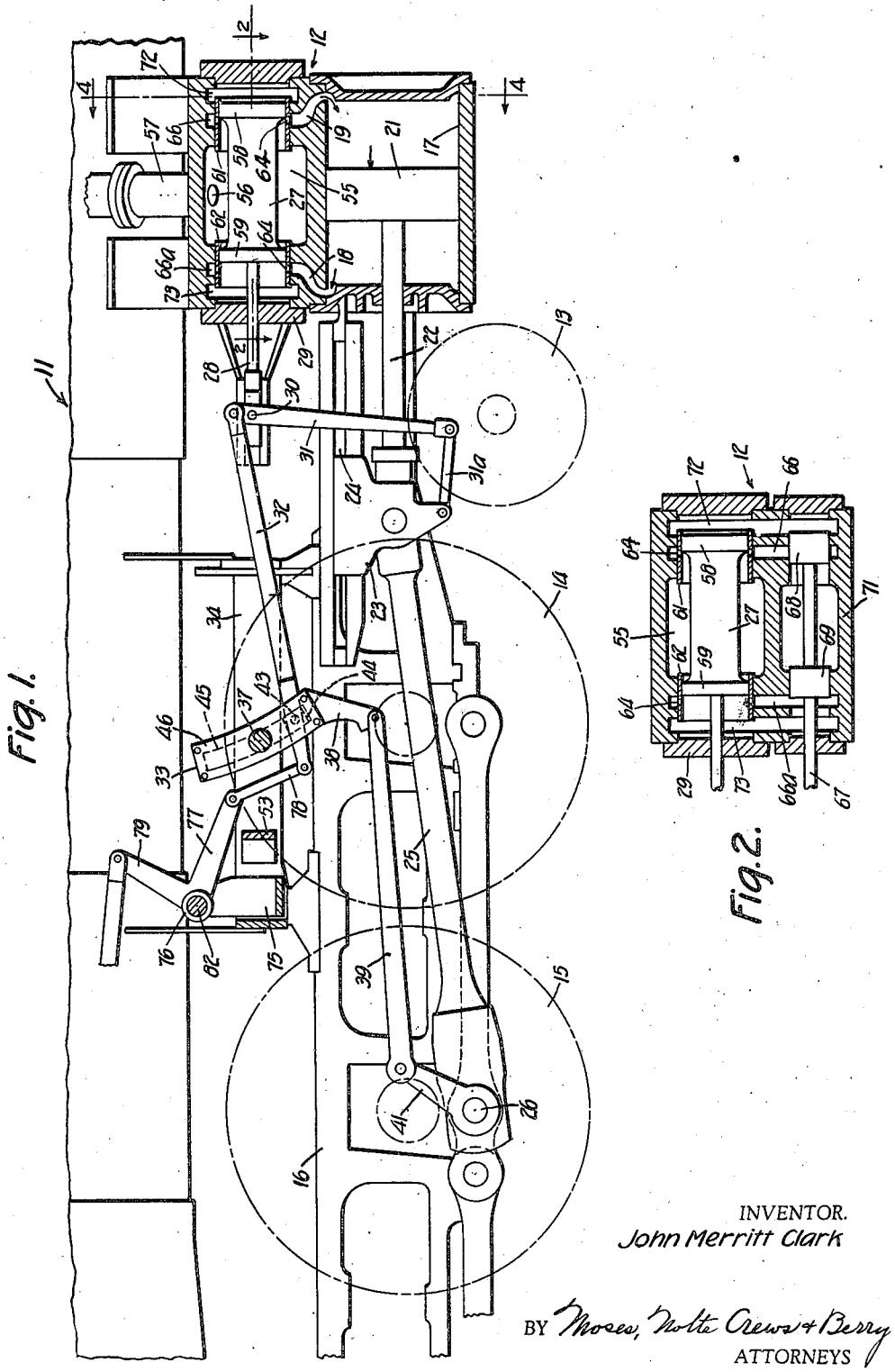
INVENTOR.
John Merritt Clark
BY Moses, Nolte, Crews & Berry
ATTORNEYS June 7, 1949.  J. M. CLARK  2,472,284
CYLINDER BACK PRESSURE VALVE
Filed March 2, 1946  2 Sheets-Sheet 2
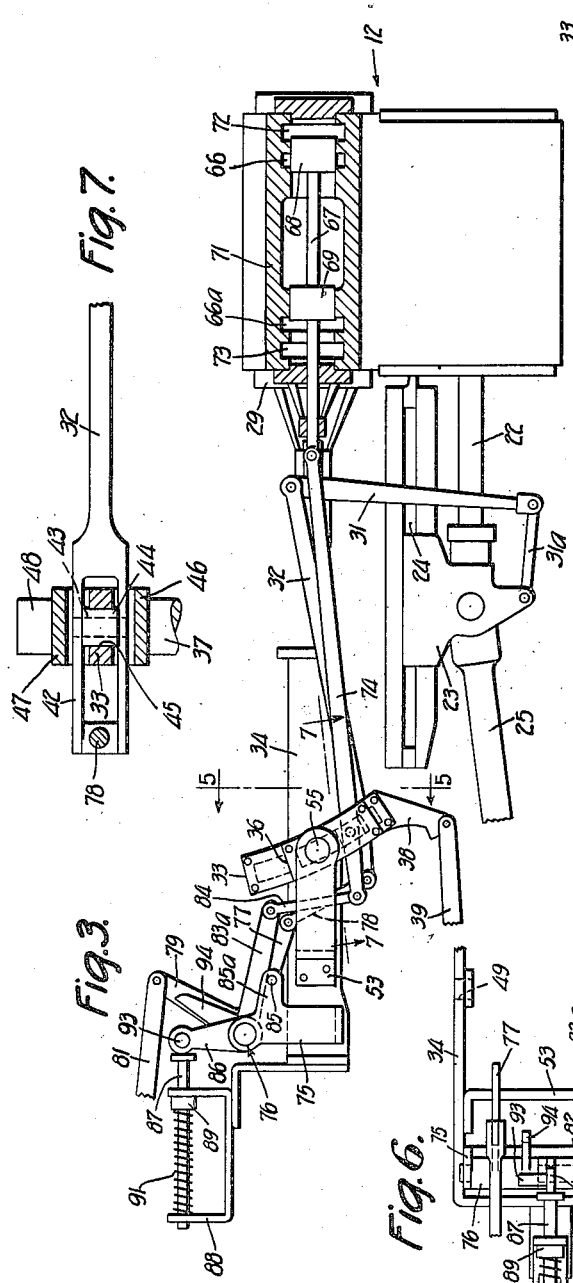
INVENTOR.
John Merritt Clark
BY Moses, Nolte, Crews & Berry
ATTORNEYS Patented June 7, 1949

2,472,284

UNITED STATES PATENT OFFICE 2,472,284

CYLINDER BACK PRESSURE VALVE

John Merritt Clark, Northfield, N. J.

Application March 2, 1946, Serial No. 653,321

4 Claims. (Cl. 121—136)

This invention relates to steam locomotives and more particularly to the valve gear control mechanism therefor.

In the engine valve gear covered by my Patent No. 2,074,165, dated March 16, 1937, there is provided an auxiliary valve adapted for independent control by the engineer and so as to be operable at high speeds to relieve back pressure in the cylinder by permitting a complete free exhaust therefrom independently of the exhaust permitted by the main valve.

In order to have this independent control of the two valves, a duplication of parts was necessary and certain of these parts were in the way of other parts if considerable space was not consumed and the adjustment of the auxiliary or free exhaust valve was not automatic for the high speeds. Its adjustment depended upon the alertness and skill of the engineer.

It is accordingly one object of this invention to provide a simple control mechanism for such main and auxiliary valves whereby the parts thereof for the two controls are kept to a minimum.

It is another object of the invention to provide an arrangement whereby adjustment of the auxiliary valve will be automatically made when adjusting the main valve to high forward speeds.

According to the invention, the auxiliary valve is located in the steam chest at a location laterally spaced from the main valve, rather than vertically spaced therefrom as in my prior construction. The linkage mechanisms for operating the respective valves thus parallel one another in a horizontal plane rather than in a vertical plane, so that access is gained to the parts of one mechanism with less interference from the parts of the other mechanism.

The rocking lever for the auxiliary valve is combined on a common axis with the reverse link lever for the main valve thereby eliminating an interconnecting linkage and separate pivots which were necessary with my prior construction. Radius rods extending rearwardly from the valves are connected to these levers for vertical adjustment relative to their pivots. In the case of the reverse link lever the radius rod connecting the lever with the main valve can be slid through the pivot point of the levers in order to reverse the operation of the locomotive. In the case of the rocking lever for the auxiliary valve, the adjustment of the radius rod connecting the lever with the auxiliary valve is effected only up to the pivot point, there being no necessity for the use of the auxiliary valve when the locomotive is operating in reverse which is accomplished at comparatively slow speeds. The respective rods of the valves in addition to being slidably connected to the levers, extend rearwardly of the levers and connect with adjusting links depending from adjusting levers also pivotable about a common axis, but relative to each other, on a bracket mounted rearwardly of the bracket which retains the rocking and reverse levers. These adjusting levers are interconnected so that as the manual control lever for the main valve, after passing through slow speed positions to high speed positions without actuating the auxiliary valve, will upon being set in the high speed positions cause adjustment of the auxiliary valve to give free exhaust. The joint adjustment of the valves for the forward speeds continues until the rods come to the pivot axis of the levers. Adjustment of the manual control lever to adjust the main radius rod to the reverse side of the pivot axis on the reverse link lever reverses the movement of the locomotive. On adjustment of the control lever to reverse the locomotive, only the main valve is adjusted, there being for reverse speeds of the locomotive no necessity for relieving back pressure. These control levers are backed up by a spring which will return them, when released, from the reverse and high speed positions to the low speed positions.

For other objects and for a better understanding of the invention, reference may be had to the following detailed description taken in connection with the accompanying drawing, in which Fig. 1 is a fragmentary view of a locomotive with a portion of the steam cylinder and chest shown in section and taken along a line through the main valve and showing only the operating mechanism for the main valve, such mechanism including the reverse shaft lever;

Fig. 2 is a cross-sectional view of the steam chest taken in a horizontal plane through both the main and auxiliary valves as indicated along line 2—2 of Fig. 1;

Fig. 3 is a view taken in a vertical plane through the auxiliary valve of the steam chest, located externally of the main valve and showing the complete operating mechanisms for both the main and auxiliary valves;

Fig. 4 is a vertical transverse section of the steam cylinder and chest looking from front to rear and taken along the line 4—4 of Fig. 1;

Fig. 5 is an elevational view in section looking from front to rear and on the line 5—5 of Fig. 3, toward the main reverse and auxiliary shaft levers which are continuously rocked by the main crank;

Fig. 6 is a fragmentary plan view looking down upon the left hand portion of Fig. 3 and showing the manually adjustable bell crank levers and their mounting means for connecting same with the main body of the locomotive;

Fig. 7 is a fragmentary plan view in section taken on line 7—7 of Fig. 3 and showing the connection of one of the links with the dual main and auxiliary shaft levers.

Referring now particularly to Figs. 1, 3 and 4, there is shown a locomotive 11 having a steam chest 12, wheels 13 and 14 and drive wheel 15. These wheels are journalled on a main supporting frame 16. Below the steam chest is a steam cylinder 17 having main admission and exhaust ports 18 and 19, a piston 21, and a piston rod 22 slidable through the rear head of the cylinder and connected with a crosshead 23, slidable in a way 24 and adapted to operate a main driving rod 25 connected to a crank pin 26 of the drive wheel 15.

Within the steam chest 12 is a main valve 27 adapted to control the passage of the steam to and from the admission and exhaust ports 18 and 19. This main valve 27 has a rod 28 which extends through a cover plate 29 of the steam chest and pivotally connects at 30 with a vertically-extending lever 31. The lower end of the lever 31 is connected through a link 31a to the crosshead 23. The upper end of the lever 31 has a main radius rod 32 connected to it and extended rearwardly for adjustable connection with a reverse link lever 33, Fig. 1, rockable in a laterally arranged bracket structure 34, Fig. 5, on the main frame. Rigid with the reverse link lever 33 and adapted to be rocked therewith is a rocking lever 36. The connection between the reverse link lever 33 and rocking lever 36 is made by means of a spacing shaft member 37. The reverse link lever 33 has a depending extension 38 connected by an eccentric rod 39 to an eccentric crank 41 rigid on the crank pin 26 by which motion is imparted to the combined lever structure.

The main radius rod 32 has a bifurcated portion 42, Fig. 7, which straddles the reverse link lever 33, and a cross pin 43 extends through a block 44 which slides for adjustment in a slot 45 of the lever 33, Figs. 5 and 7. Secured upon opposite sides of the reverse link lever 33, are brackets 46 and 47. A stub shaft or trunnion 48 extends laterally from the bracket 47 and pivots in a journal opening 49 in the bracket structure 34. The auxiliary rocking lever 36 has bracket plates 51 and 52. The bracket 52 is tied to the bracket 46 of the link arm 33 by the shaft 37. The bracket structure 34 includes a bracket piece 53, Fig. 5, which extends laterally and forwardly to provide a journal opening 54 into which extends a stub shaft or trunnion 55 rigid with the lever bracket plate 51.

The main valve 27 operates in a chamber 55 to which steam is delivered from a main admission passage 56 of a pipe extension, Figs. 1 and 4. The valve 27 has front and rear piston portions 58 and 59 which are respectively slidable in valve liners 61 and 62. Each of the liners have orifices 64 spaced around them and in communication with the main admission and exhaust passages 18 and 19 and with auxiliary passages 66 and 66a, Fig. 2, associated with an auxiliary valve 67 also having two piston portions 68 and 69. Housing portion 71 for the auxiliary valve 67 is horizontally aligned with the main valve instead of being vertically-aligned as in my previous construction.

Main exhaust passages 72 and 73 lie adjacent the respective piston portions of the main and auxiliary valves.

The auxiliary passages 66 and 66a are controlled by the auxiliary valve 67 and permit the main cylinder 17 to be exhausted when desired independently of the main exhaust passages.

The auxiliary piston valve 68 is connected by a radius rod 74, Fig. 3, to the auxiliary valve rocking lever 36 in the same manner that the main rod 32 is connected to the reverse shaft lever and as shown more clearly in Fig. 7. As the rod 74 is adjusted from its down position to the pivot axis in the lever 36, the auxiliary valve is adjusted to provide for free exhaust at the high speed adjustment of the main valve. Since the reverse link lever depends downwardly to a greater extent than rocking lever 36, a play is allowed for adjustment of the main rod and its valve for the low speeds before joint adjustment of the rods and their valves are made to provide for the high speeds. Also, the reverse shaft lever extends above the pivot axis of the levers while the rocking lever 36 does not so extend. When the main rod 32 is passed above the pivot axis it sets the main valve to effect reverse movement of the locomotive.

With the main valve 27 in the position shown in Figs. 1 and 2, steam is being admitted through port 19 to the front end of the cylinder whereby to force the piston 21 rearwardly. Exhaust steam leaves the rear of the cylinder through port 18 and openings 64 in the sleeve 62. The main valve front piston 58 blocks the main exhaust passage 72 and the auxiliary valve piston 68 blocks the auxiliary exhaust passage 66. The opposite pistons of the valves leave the main exhaust passage 73 and auxiliary exhaust passage 66a wide open for the spent steam. Since the auxiliary passages 66 and 66a surround the liners, the steam from ports 18 or 19 are given free and full opportunity to exhaust.

When one of the pistons 68 or 69 of the auxiliary valve is in its outermost position as shown in connection with piston 68 of Fig. 2 the auxiliary exhaust passage 66 is closed. The arrangement is such that the auxiliary valve automatically frees the portion of the main steam valve that is closed on the exhaust side of the main valve when the same is on a fine cut off point in head motion of the locomotive. It will be understood that liners similar to 61 and 62 for the pistons 58 and 59 of the main valve 27 may be associated with the pistons 68 and 69 of the auxiliary valve.

In order to alter the stroke of the main and auxiliary valves, there is provided a combined set of adjusting levers, Figs. 3 and 6, adapted for connection with rear ends of the radius rods 32 and 74. In rear of the bracket piece 53 is a laterally-extending U-shaped bracket piece 75 on which is trunnioned a shaft 76 having an arm 77 connected by a link 78 to the rear end of the main radius rod 32. A second arm 79 extends upwardly from the shaft 76 for connection with an operating rod 81 that extends to the locomotive cab and which the engineer operates to alter the main valve for different forward and reverse speeds.

Loose on a reduced portion 82 of shaft 76 is a sleeve 83 having an arm 83a which connects by means of a link 84 with the rear end of the auxiliary radius rod 74. This arm 83a is normally supported on a stop 85 extending laterally from an ear 85a of bracket 75. Extending upwardly on the sleeve 83 is an arm 86 adapted to abut against a spring rod 87 carried on a bracket structure 88. This rod 87 has a collar 89 secured thereto and adapted to press against a spring 91 upon the rod 87 as the rod is slid rearwardly through the bracket structure 88. The arm 86 has a laterally extending pin 93, Fig. 3, adapted to be abutted by a vertically extending arm 94 which is rigid with the shaft 76 and operated therewith as the arm 79 is pulled forward by the operating arm 81 at the time the main valve is to be adjusted. It will be noted that there is lost motion space between the arm 94 and the pin 93. This lost motion space permits adjustment of the main valve for the slow speeds of the locomotive and independent of the adjustment of the auxiliary valve. If the shaft 76 is rotated to the high speed position the radius rod 32 is raised further on the reverse shaft lever so that arm 94 contacts the pin 93 and effects the joint adjustment of the rods 32 and 74 thereby to position the auxiliary valve to effect free exhaust. This joint adjustment of the arms 77 and 83a is resisted by the spring 91. The spring 91 will continue to resist the adjustment of the arm 77 after the rod 74 has arrived at the top of the slot of the rocking lever 36 and as the rod 32 is passed through the pivot axis of the reverse shaft lever to cause the main valve to effect the reverse movement of the locomotive. If the manual control is released, the spring will return the parts to a slow forward speed position.

It should now be apparent that I have provided a simple and automatic control for the auxiliary or free exhaust valve used with steam engines to relieve back pressure from the cylinder during the high forward speeds.

I have described what I believe to be the best embodiments of my invention. I do not wish, however, to be confined to the embodiments shown, but what I desire to cover by Letters Patent is set forth in the appended claims.

I claim:

1. In a valve gear assembly, a steam cylinder having main admission and exhaust openings, a steam chest on the cylinder, a main valve in the steam chest for controlling the flow of steam through said cylinder openings, means including a main radius rod extending from said valve, an auxiliary valve in the steam chest for relieving back pressure in the steam cylinder when operated at high speeds, an auxiliary radius rod extending from the auxiliary valve, a combined rockable structure including a reverse link lever and an auxiliary rocking lever, said radius rods connected to the respective levers for adjustment toward and away from the pivot axis of the rockable structure, and manually-adjustable means connected to the radius rods to effect their adjustment upon the rockable structure.

2. The valve gear assembly as defined in claim 1 wherein said manually-adjustable means comprises a pair of adjusting levers connected respectively to the radius rods and separated from one another by a lost motion connection whereby one lever can be moved throughout a part of its motion to adjust one valve without adjusting the other but moves the other lever throughout another part of its motion to simultaneously adjust both valves.

3. In a valve gear assembly for steam engines, a steam cylinder having main admission and exhaust openings, a steam chest on the cylinder, a main valve in the steam chest for controlling the flow of steam through said openings, a reverse link lever adapted to be rocked by the engine, a radius rod for operating the main valve connected to the reverse link lever for adjustment through its rocking pivot to one side or the other thereof, an auxiliary valve for relieving back pressure within the steam cylinder, an auxiliary rocking lever connected to the reverse link lever to be rocked therewith about the pivot axis thereof, a radius rod for operating the auxiliary valve connected to the auxiliary rocking lever for adjustment thereupon to and from the rocking pivot of the combined levers, and lost-motion means for manually setting the radius rods upon their respective levers to provide for free adjustment of radius rod for the main valve for the slow forward speeds of the engine and for automatic adjustment of the auxiliary rod and its valve when the main valve is being set to the high forward speed positions.

4. A valve gear assembly as defined in claim 3 wherein said lost-motion manually setting means comprises two adjusting levers respectively connected to the radius rods, stop means on one of the latter adjusting levers adapted to be engaged by the other adjusting lever for conjoint adjustment of the valves, and spring means serving to resist the movement of the levers when they are being adjusted together and to return the same to a slow speed position when they are released from their joint adjusted positions.

JOHN MERRITT CLARK.

REFERENCES CITED

The following references are of record in the file of this patent:

UNITED STATES PATENTS

| Number | Name | Date |
|---|---|---|
| 1,002,112 | Allfree | Aug. 29, 1911 |
| 1,038,261 | Allfree | Sept. 10, 1912 |
| 1,096,614 | Faisant | May 12, 1914 |
| 2,074,165 | Clark | Mar. 16, 1937 |